A. J. NOBLETT.
COTTON CHOPPER.
APPLICATION FILED MAR. 6, 1916. RENEWED JUNE 18, 1917.
1,237,804.
Patented Aug. 21, 1917.
3 SHEETS—SHEET 1.
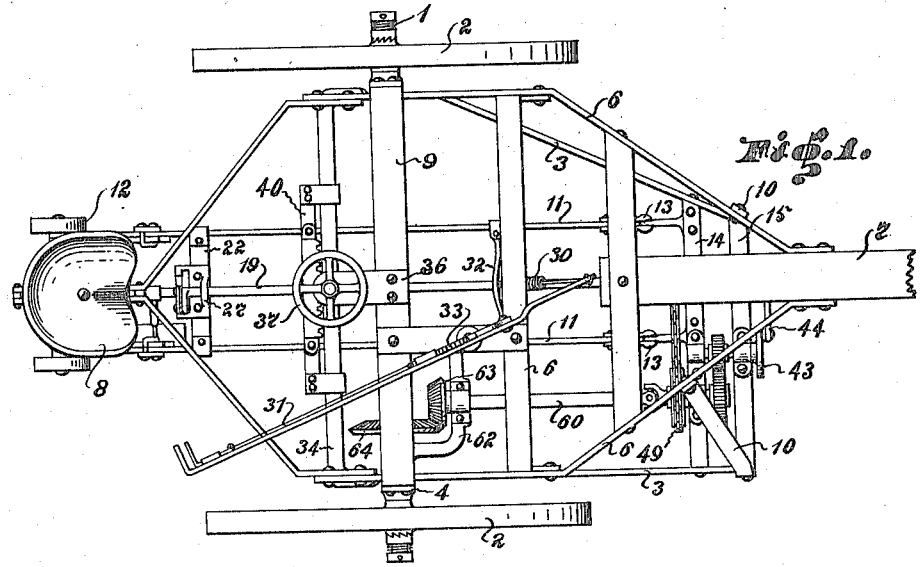
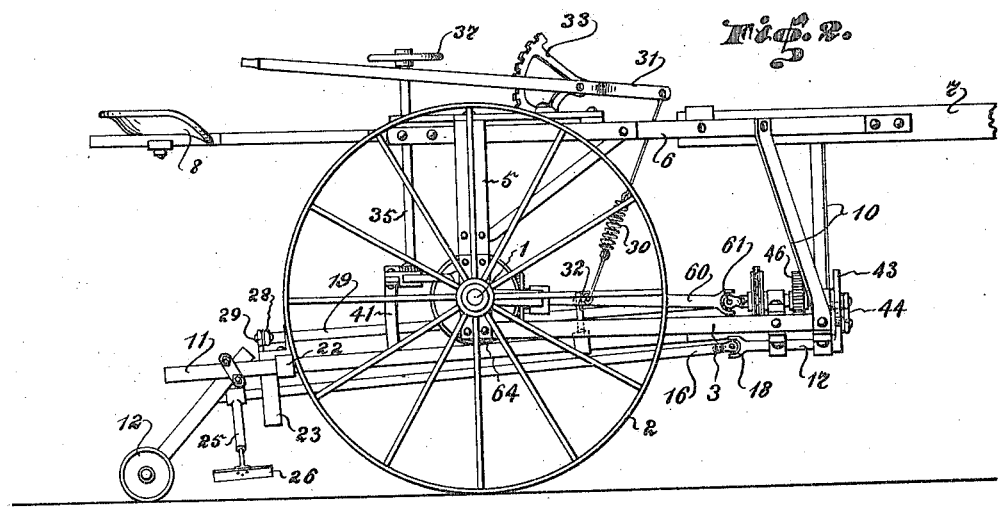
WITNESS
C. W. Ellis
INVENTOR
A. J. Noblett
BY
John M. Spellman
ATTORNEY A. J. NOBLETT.
COTTON CHOPPER.
APPLICATION FILED MAR. 6, 1916. RENEWED JUNE 18, 1917.
1,237,804.
Patented Aug. 21, 1917.
3 SHEETS—SHEET 2.
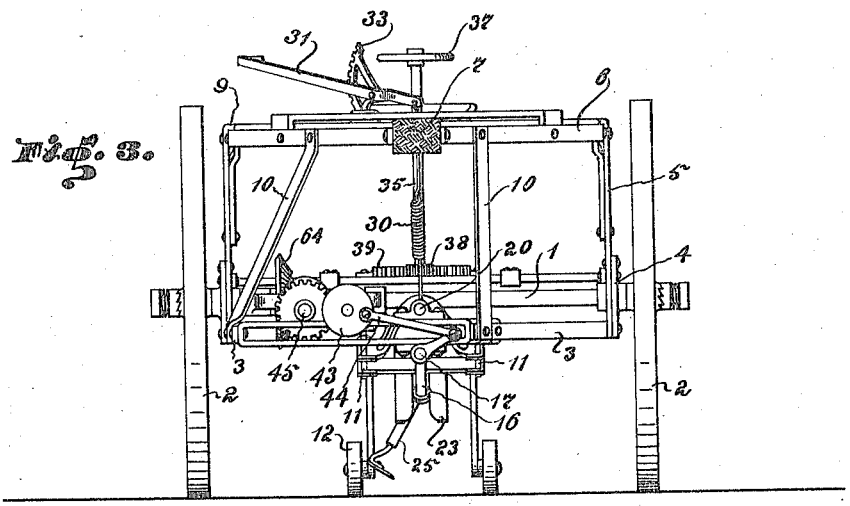
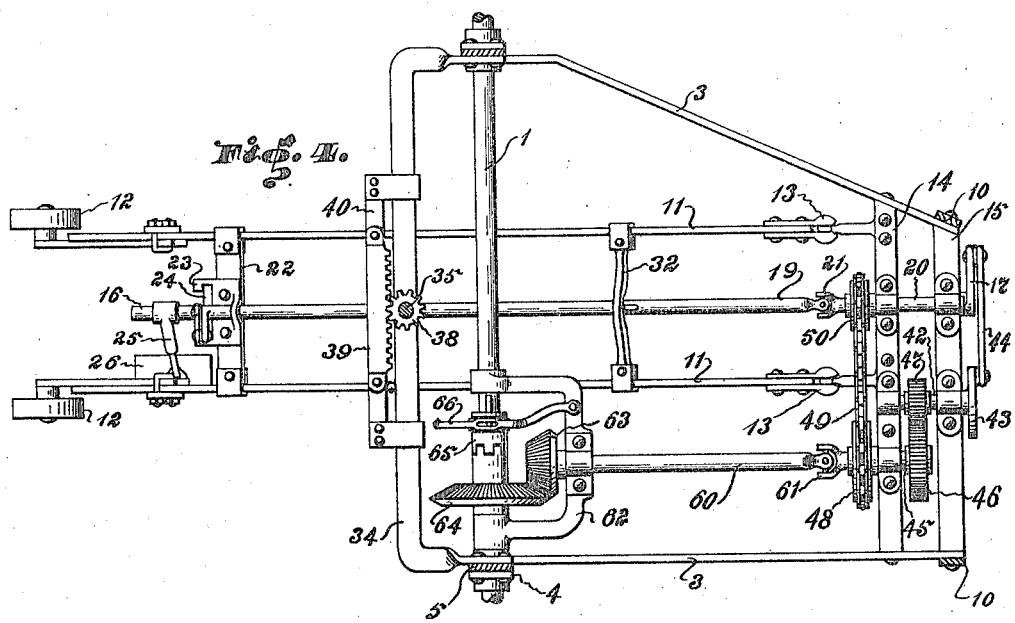
WITNESS
C. M. Ellis
INVENTOR
A. J. Noblett
BY
John M. Spellman
ATTORNEY

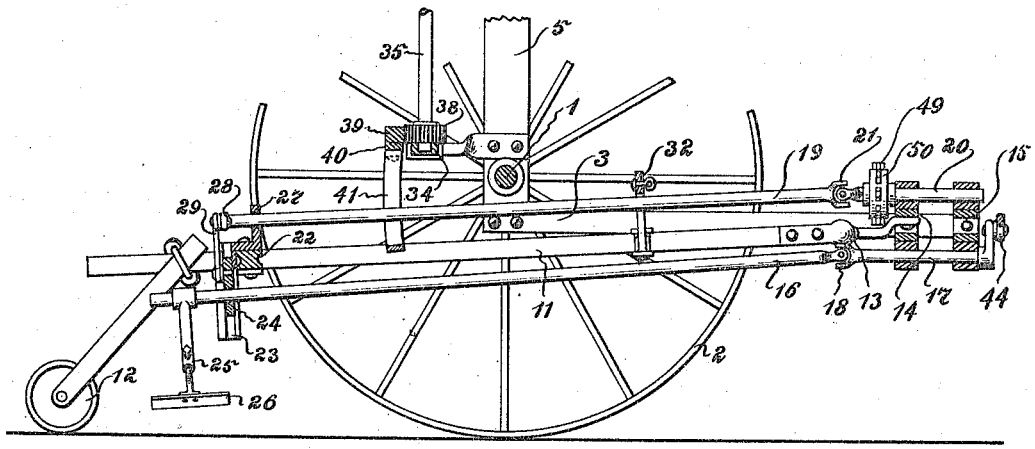

UNITED STATES PATENT OFFICE.

ADONIRAM J. NOBLETT, OF FORT WORTH, TEXAS.

COTTON-CHOPPER.

1,237,804.　　　　Specification of Letters Patent.　　Patented Aug. 21, 1917.

Application filed March 6, 1916, Serial No. 82,509. Renewed June 18, 1917. Serial No. 175,523.

*To all whom it may concern:*

Be it known that I, ADONIRAM J. NOBLETT, a citizen of the United States, residing at Fort Worth, in the county of Tarrant and State of Texas, have invented certain new and useful Improvements in Cotton-Choppers, of which the following is a specification.

This invention pertains to new and useful improvements in cotton choppers.

One of the principal features of the invention is to provide in a cotton chopper a chopping tool or hoe so constructed and arranged that it may, while revolving, not only be raised and lowered to compensate for the irregular contour of the ground but also be swung from right to left in a novel manner.

In the carrying out of the invention there is provided a supporting or main frame mounted on ground wheels; a suspended chopping frame under the main frame; hoe operating elements having universal connection with driving means located on the main frame; and an oscillating mechanism of peculiar type through the agency of which the hoe is caused to revolve in an elliptical orbit the longer diameter of which is disposed vertically, whereby the hoe in chopping will chop the plant close to the ground and its stroke across the row will be reduced and the soil less disturbed.

Other novel features of the invention will be apparent from a perusal of the following specification and the invention will be more fully understood by reference to the accompanying drawings in which an example is shown and wherein:

Figure 1 is a plan of the chopper,

Fig. 2 is a side elevation,

Fig. 3 is a front elevation,

Fig. 4 is a plan view of the main and chopping frames and the axle driving connection, Fig. 5 is a partial longitudinal sectional view, Fig. 6 is a detail in elevation of the hoe actuating mechanism, and Fig. 7 is a detail in elevation of the hoe shifting means.

In the drawings the numeral 1 designates an axle on which ground wheels 2 are mounted so as to revolve the axle when the machine is drawn forward. A main frame 3 is mounted forward of the axle and rigidly secured to boxes 4 mounted on said axle and from which uprights 5 rise. These uprights rigidly support a top frame 6 connected with a tongue 7 at its forward end and mounting a seat 8 at its rear end. A top cross bar 9 connected with the uprights forms therewith a supporting arch. The forward end of the main frame is rigidly supported by bars 10 depending from the forward end of the frame 6.

An elongated chopping frame is disposed under the main frame and comprises a pair of spaced parallel bars 11 supported on furrow casters 12 at their rear ends and mounting each a ball and socket joint 13 at its forward end. The forward end of the main frame is contracted as best shown in Fig. 4 and carries two rigid transverse bars 14 and 15 respectively, one set in advance of the other. The joints 13 are attached to the bar 14. Disposed longitudinally and centrally of the chopping frame is a hoe shaft 16 connected at its forward end with a crank shaft 17 by means of a universal joint 18, the shaft 17 being suspended under the bars 14 and 15. Directly over and above the hoe shaft another shaft 19 is disposed as is best shown in Fig. 5. A stub shaft 20 mounted on the bars 14 and 15 is connected with the shaft 19 by a universal joint 21.

Driving means hereinafter described revolves the shaft 19 and rocks the hoe shaft 16. Near the rear end of the chopping frame a transverse hanger 22 is mounted on the bars 11 and carries at its center a depending channel plate 23 in which a head-plate 24 is arranged to slide vertically. The hoe shaft 16 extends through the plate 24 and is raised and lowered by the reciprocation of said plate. An arm 25 is fixed on the rear end of the hoe shaft and carries a hoe or chopping tool 26. The shaft 19 is supported over the hanger in a bracket 27 and terminates in a crank arm 28 pivoted to the upper end of a link 29 which has its lower end pivoted to the head-plate 24. It will be apparent that as the hoe 26 is rocked from side to side as indicated by full and dotted lines in Fig. 6 it will be at the same time caused to travel through an elliptical orbit with its greater diameter disposed vertically, due to the reciprocation of the plate 24. This will reduce the transverse sweep of the hoe and cause the latter to chop the plants in a manner substantially the same as a manually swung hoe.

The chopping frame is supported by a resilient connection 30 extending from the forward end of a hand lever 31 to a yoke 32 spanning the bars 11. The hand lever 31 is pivoted on a locking segment 33 of the usual construction mounted on the top frame 6 as shown. By means of this lever and the connections the chopping frame may be swung in a vertical arc by reason of the joints 13. It is obvious that the spring connection 30 permits a limited independent vertical swing of the chopping frame so that the casters 12 may follow the contour of the ground; however the chopping frame may be adjusted vertically by means of the lever in accordance with the depth to which it is necessary for the hoe 26 to cut in any instance.

It is quite evident that a transverse adjustment of the chopping frame is necessary in order that staggered plants may be chopped and the course of the row followed. To accomplish this a U-shaped flat bar 34 is extended transversely in rear of the axle and has its ends secured to the uprights 5 just above the axle. A vertical shaft 35 has its lower end mounted in this bar while its upper end projects above the bar 9 and is supported in a bracket 36. The shaft is rotated by a hand wheel 37. A pinion 38 is fastened on the shaft over the bar 34 and meshes with a gear rack 39 mounted on a yoke 40 slidable on the bar 34. A keeper 41 straddles the shaft 19 and depends from the yoke 40. It will be seen that by rotating the shaft 35 the yoke 40 will be adjusted laterally whereby the chopping frame will be swung to the right or the left as the case may be.

For revolving the shaft 19 and rocking the hoe shaft 16 a driving mechanism is provided. On the bars 14 and 15 a counter shaft 42 is suitably mounted. A disk 43 is fastened on the forward protruding end of the counter shaft and is revolved thereby. A link 44 eccentrically pivoted to the disk has its opposite end pivoted to the outer end of crank of the shaft 17. The proportions of the parts are such that a complete revolution of the disk will merely oscillate the crank shaft 17 whereby the hoe shaft 16 is rocked as described.

A driven shaft 45 is suitably mounted on the bar 14 adjacent the counter shaft and carries a gear 46 meshing with and driving a pinion 47 fastened on the counter shaft. Immediately in rear of the bar 14 a sprocket wheel 48 is fastened on the shaft 45 and drives by means of a chain 49, a smaller sprocket wheel 50 fastened on the shaft 20, whereby the shaft 19 is revolved. A drive shaft 60 has connection with the driven shaft 45 by means of a universal joint 61 and has its rear end supported in a bearing yoke 62 mounted on the axle 1. Within the yoke a pinion 63 is fastened on the end of the drive shaft and meshes with and is driven by a beveled gear 64 loosely confined on the axle and provided with a clutch hub. A clutch collar 65 splined on the axle is slidable by means of a lever 66 engaging the same and pivoted on the yoke. When the collar is thrown into engagement with the clutch hub the gear 64 will be revolved by the axle, otherwise it will remain idle.

What I claim, is:

1. In a cotton chopper, the combination with a main frame, a revolving axle on which the frame is mounted, and ground wheels fastened on the axle; of a central longitudinal chopper frame hinged at its forward end to the main frame; means for bodily adjusting the chopper frame vertically independently of the main frame; means for laterally adjusting the chopper frame with relation to the main frame; a hoe shaft disposed in the chopper frame; a chopping tool carried by the hoe shaft; means for vertically reciprocating the hoe shaft; and means for rocking the hoe shaft.

2. In a cotton chopper, the combination with a wheel supported main frame, a chopper frame connected with the main frame, a hoe shaft carried by the chopper frame, and a chopping tool carried by the hoe shaft; of a reciprocating device connected with the hoe shaft; and means for rocking the hoe shaft, said reciprocating device acting vertically as the shaft is rocked whereby the chopping tool is carried through an elliptical orbit having its greater diameter disposed vertically.

3. In a cotton chopper, the combination with a wheel supported main frame, a chopper frame connected with the main frame, a hoe shaft carried by the chopper frame, and a chopping tool carried by the hoe shaft; of a transverse hanger mounted on the rear end of the chopper frame; a revolving shaft supported by the hanger and having a crank arm on its end; a sliding member carried by the hanger and supporting the hoe shaft; a connection between the crank arm of the revolving shaft and the sliding member; and means for rocking the hoe shaft.

4. In a cotton chopper, the combination with a wheel supported main frame; of a chopper frame hinged at its forward end to the main frame and wheel supported at its rear end; a revolving shaft disposed longitudinally and centrally of the chopper frame; a driving element mounted on the main frame and having pivoted connection with the revolving shaft; a longitudinal hoe shaft disposed centrally of the chopper frame under the revolving shaft; a rocking device mounted on the main frame and having pivotal connection with the hoe shaft whereby the latter is rocked; a chopping tool carried by the hoe shaft; a reciprocating device connected with and operated by the revolving shaft and carrying the hoe shaft; and means for imparting motion to the driving element and the rocking device.

In testimony whereof I have signed my name to this specification in the presence of two subscribing witnesses.

ADONIRAM J. NOBLETT.

Witnesses:
W. B. TOWNSEND,
W. H. HAYES.